US006965373B1

(12) United States Patent
Clapper

(10) Patent No.: US 6,965,373 B1
(45) Date of Patent: Nov. 15, 2005

(54) CONTROLLING WIRELESS PERIPHERALS FOR PROCESSOR-BASED SYSTEMS

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 404 days.

(21) Appl. No.: 09/526,780

(22) Filed: Mar. 16, 2000

Related U.S. Application Data

(63) Continuation-in-part of application No. 09/405,575, filed on Sep. 27, 1999, now Pat. No. 6,704,007.

(51) Int. Cl.[7] .............................................. G09G 5/00
(52) U.S. Cl. ..................................... 345/169; 345/158
(58) Field of Search ........................ 361/680; 398/111; 340/825.72; 341/120, 122, 176; 345/156, 345/158, 162, 168, 169, 214, 649, 157, 160

(56) References Cited

U.S. PATENT DOCUMENTS

| | | | | |
|---|---|---|---|---|
| 5,307,297 A | * | 4/1994 | Iguchi et al. ................ | 364/708 |
| 5,563,631 A | * | 10/1996 | Masunaga .................... | 345/169 |
| 5,602,566 A | * | 2/1997 | Motosyuku et al. ........ | 345/684 |
| 5,825,612 A | * | 10/1998 | Aubuchon et al. .......... | 361/680 |
| 5,847,698 A | * | 12/1998 | Reavey et al. .............. | 345/173 |
| 5,926,170 A | * | 7/1999 | Oba ............................ | 341/20 |
| 6,094,156 A | * | 7/2000 | Henty .................... | 340/825.69 |
| 6,097,374 A | * | 8/2000 | Howard ....................... | 345/168 |
| 6,108,716 A | * | 8/2000 | Kimura et al. .............. | 345/168 |
| 6,111,569 A | * | 8/2000 | Brusky et al. ............. | 211/26.1 |
| 6,141,003 A | * | 10/2000 | Chor et al. .................. | 345/719 |
| 6,151,208 A | * | 11/2000 | Bartlett ....................... | 361/683 |
| 6,215,420 B1 | * | 4/2001 | Harrison et al. ............. | 341/22 |
| 6,243,035 B1 | * | 6/2001 | Walter et al. ............... | 341/173 |
| 6,271,831 B1 | * | 8/2001 | Escobosa et al. ........... | 345/158 |
| 6,297,802 B1 | * | 10/2001 | Fujioka ....................... | 345/156 |
| 6,304,250 B1 | * | 10/2001 | Yang et al. ................... | 341/22 |
| 6,307,499 B1 | * | 10/2001 | Williamson et al. ........ | 341/176 |
| 6,347,290 B1 | * | 2/2002 | Bartlett ....................... | 702/150 |
| 2002/0044136 A1 | * | 4/2002 | Griffin et al. ............... | 345/169 |

\* cited by examiner

Primary Examiner—Bipin Shalwala
Assistant Examiner—Nitin Patel
(74) Attorney, Agent, or Firm—Trop, Pruner & Hu, P.C.

(57) ABSTRACT

A wireless peripheral may include at least one keyboard and at least two key orientations. In one embodiment of the present invention, a pair of keyboards may be provided on opposite sides of the wireless peripheral. Each of said keyboards may drive a separate interface. The interfaces may be oriented on the peripheral so that when a particular key orientation is chosen for use by orienting the peripheral appropriately, its associated interface is aligned with a processor-based system which receives commands from the peripheral. Thus, the effect of the wireless peripheral may be changed depending on its orientation.

9 Claims, 4 Drawing Sheets

CONTROLLING WIRELESS PERIPHERALS FOR PROCESSOR-BASED SYSTEMS

This application is a continuation-in-part of U.S. patent application Ser. No. 09/405,575 filed Sep. 27, 1999 now U.S. Pat. No. 6,704,007.

BACKGROUND

This invention relates generally to processor-based systems and particularly to wireless peripheral devices for use in controlling such systems.

Wireless keyboards, wireless mice and wireless remote control units may provide input signals to a processor-based system. For example, wireless keyboards and wireless mice may be utilized to control conventional desktop computer systems. Similarly, remote control units may be utilized to control processor-based systems such as set-top boxes which operate in conjunction with a conventional television receiver. Wireless peripherals may be advantageous because they do not tether the user to the processor-based system. In some cases, the user may operate the processor-based system from a considerable distance.

Conventionally, wireless peripheral devices have a dedicated function. Thus, the user who desires to control a processor-based system using wireless technology may have a separate mouse and a separate keyboard for that system. In the case of a set-top box, the user may have a wireless mouse, a wireless keyboard and a wireless remote control unit for controlling television and computer functions.

Thus, there is a continuing need for better ways to use wireless peripherals for controlling processor-based systems.

DETAILED DESCRIPTION

Figure 1:
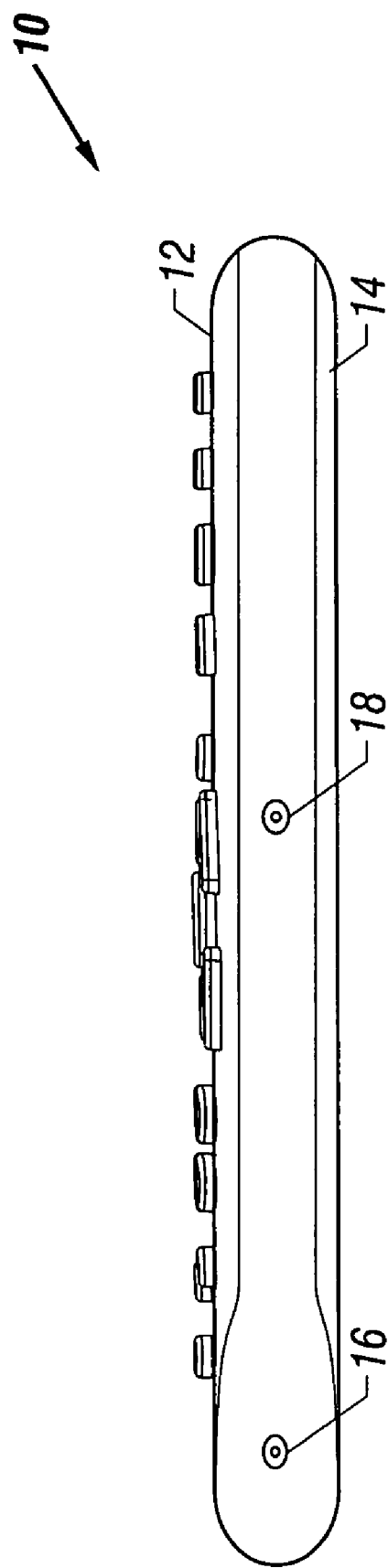
FIG. 1 is a perspective view of one embodiment of the present invention in a first orientation.

A wireless peripheral device 10, shown in FIG. 1, for use with a processor-based system (not shown in FIG. 1) includes at least one keyboard 12 having keys which may be utilized to generate input commands for a processor-based system. The wireless peripheral device 10 may include a first wireless interface 16 and a second wireless interface 18.

In one embodiment of the present invention, a single keyboard, such as the keyboard 12, may be provided. Operation of the same key may result in the generation of a different command through each interface 16 and 18. In one embodiment of the present invention, each of the interfaces 16 and 18 points more directly at the processor-based system when the device 10 is in an orientation dedicated to a function implemented by a particular interface 16 or 18.

That is, depending on the orientation of the device 10, one of the interfaces 16 or 18 is pointed at a receiver on a processor-based system and the other of the interfaces is pointed away from the receiver. If the power of the interface is not too great, the signal from the interface pointed directly at the receiver will be recognized by the receiver and the signal from the other interface will be ignored.

The interfaces 16 and 18 advantageously develop signals which are at least 45 degrees apart to avoid simultaneous reception of both signals by the same receiver. Advantageously, the interfaces 16 and 18 are angularly separated by approximately 90 degrees or more.

In other embodiments of the present invention, two separate keyboards may be provided, for example, on opposite sides of the device 10. Thus, in one embodiment of the present invention, a keyboard 12 may be provided on one side and a keyboard 14 may be provided on the other side. The keyboard 14 may operate the interface 18 and the keyboard 12 may operate the interface 16.

In one embodiment of the present invention, the device 10 implements the functions of a remote control unit and a keyboard. However, it may also be possible to provide a mouse functionality as well. For example, any combination of a remote control unit, keyboard or mouse functionality may be incorporated on two sides of the device. Alternatively, a third interface may be provided on a separate surface of the device 10. In such case, in one orientation the device acts as a mouse, in another orientation the device acts as a keyboard and in still another orientation the device may act as a remote control unit.

Figure 2:
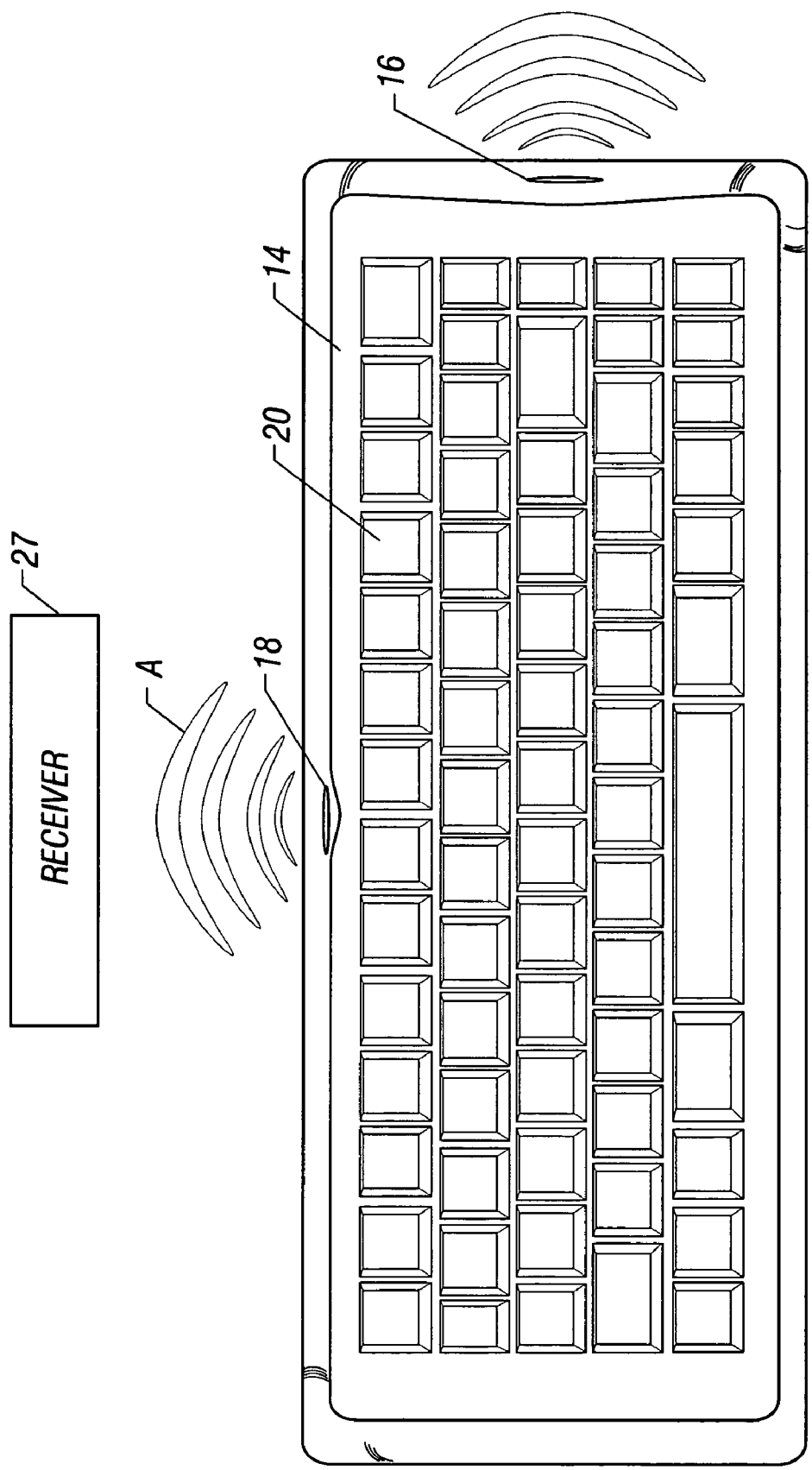
FIG. 2 is a bottom plan view of the embodiment shown in FIG. 1 in a different orientation.

A different set of keys 20 may be provided, in one embodiment of the present invention, to implement each desired functionality. Thus, with the device 10 positioned upside down as shown in FIG. 2, the keyboard 14 may be exposed and the interface 18 may be directed towards the controlled processor-based receiver 27. In one embodiment of the present invention, a reduced sized keyboard 14, such as a qwerty keyboard, may be utilized to provide a compact arrangement. Other known reduced format keyboards may be utilized as well. Thus, with the device 10 in the orientation shown in FIG. 2, keyboard commands, indicated by the signal A, are issued through the interface 18 to the processor-based receiver 27.

At the same time commands inadvertently entered on the keyboard 12 are developed by the interface 16. However, since the interface 16 is angled away from the receiver 27, they are not received at the receiver 27. Thus, with the keys 20 oriented properly relative to the user, the interface 18 is automatically aligned to control the receiver 27. Conversely, the interface 16, controlled by the keyboard 12 is misaligned relative to the receiver 27.

Figure 3:
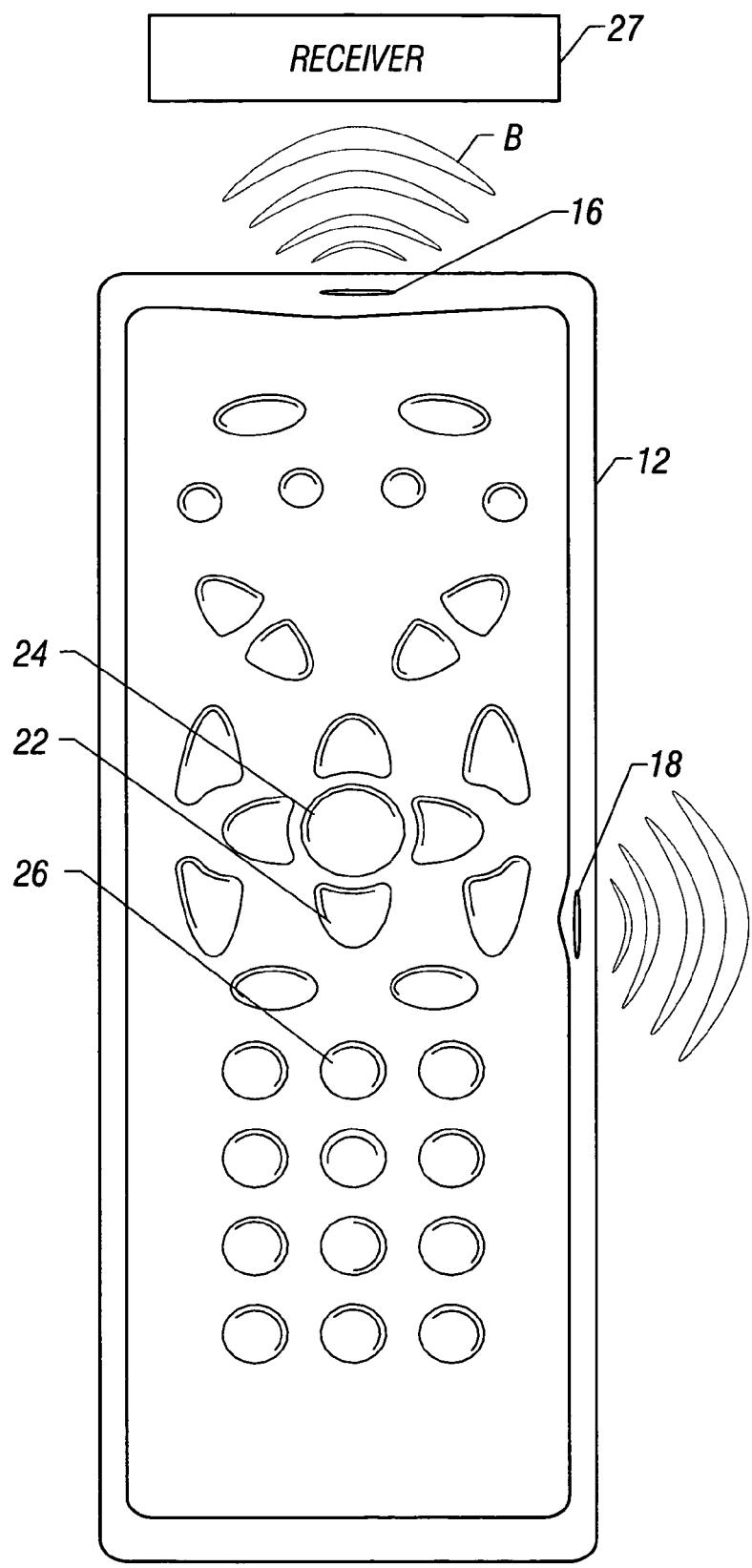
FIG. 3 is a top plan view of the embodiment of FIG. 1 in still another orientation.

In the orientation shown in FIG. 3, the keyboard 12 is upwardly pointing and the interface 16 is directed toward the processor-based receiver 27. As a result, the signal B issued by the device 10 is detected by the processor-based receiver 27 and is utilized as an input command.

The signal provided by the interface 18 is directed transversely relative to the receiver 27 when the keyboard 12 is oriented properly relative to the user. In such case, the signal from the interface 18 does not control the receiver 27.

The keyboard 12 implementing a remote control unit in one embodiment may include a plurality of numerical keys 26, arrow buttons 22 for moving an on-screen cursor and a selection button 24 situated in between the arrow buttons 22. Other buttons may be provided as well.

Thus, the user can reorient a single device and can thereby automatically obtain two or more functionalities from the same device 10. In some cases, two keyboards may be provided on opposed sides but in other cases, a single keyboard may provide different functionalities depending on its orientation.

Figure 4:
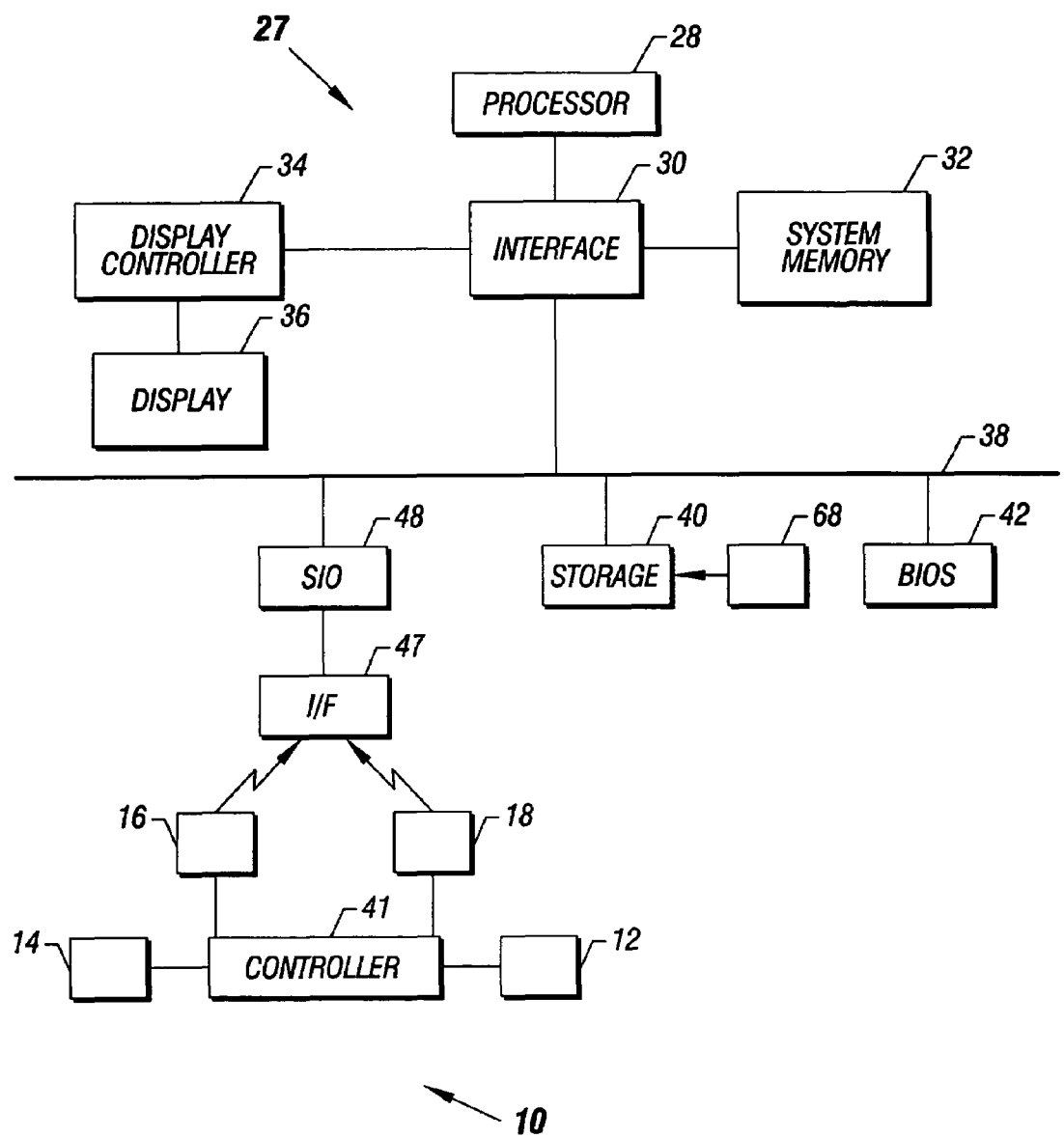
FIG. 4 is a schematic depiction for one embodiment of the invention.

Thus, referring to FIG. 4, a processor-based system 27 may include a processor 28 coupled to an interface 30. The interface 30, for example, may be a chipset or a bridge. The interface 30 may couple to a bus 38, a system memory 32, and a display controller 34. A display controller 34 may in turn be coupled to a display 36 which may be a television receiver.

The bus 38 may be coupled to a serial input/output (SIO) device 48, a storage device 40 which stores software 68 and a basic input/output system (BIOS) 42. The SIO 48 may be coupled to an interface 47 which receives input signals from the interfaces 16 and 18 of the wireless peripheral device 10. Only one interface 16 or 18 communicates with the interface 47 depending on the orientation of the device 10.

The device 10 may have two keyboards 12 and 14 coupled through a processor-based controller 41 in one embodiment of the invention. The controller 41 communicates with the wireless interfaces 16 and 18.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A wireless peripheral for a receiver comprising:
   a housing;
   only one keyboard defined on said housing, said keyboard providing different functionalities depending on the orientation of said housing; and
   a pair of wireless interfaces that transmit wireless signals directed at sufficiently spaced angles with respect to one another to enable said receiver to distinguish one of said signals from the other of said signals.

2. The peripheral of claim 1 including a controller coupled to said interfaces and said keyboard.

3. The peripheral of claim 2 wherein said wireless interfaces are infrared interfaces.

4. The peripheral of claim 1 wherein said interfaces are angled sufficiently such that only one of said signals is detected by said receiver.

5. The peripheral of claim 4 wherein said interfaces are oriented to generate wireless signals at an angle of greater than 45° from one another.

6. The peripheral of claim 1 wherein said keyboard has at least two different orientations, such that when said keyboard is arranged relative to a user in each of said orientations, a different one of said interfaces is aligned with said receiver.

7. A wireless peripheral for a receiver comprising:
   a housing;
   only one keyboard defined on said housing, said keyboard providing at least two functionalities, each functionality associated with a different orientation of said housing; and
   a pair of wireless interfaces that transmit wireless signals, each of said interfaces associated with a different one of said two orientations of said housing, said wireless interfaces being oriented relative to one another to enable said receiver to determine which of said orientations said housing was in at the time a signal was transmitted by an interface.

8. The peripheral of claim 7 wherein said interfaces are infrared interfaces.

9. The peripheral of claim 7 wherein said keyboard has at least two different orientations, such that when said keyboard is arranged relative to user in each of said orientations, a different one of said interfaces is aligned with said receiver.

* * * * *